(12) United States Patent
Eriksson et al.

(10) Patent No.: US 7,789,185 B2
(45) Date of Patent: Sep. 7, 2010

(54) SAFETY ARRANGEMENT

(75) Inventors: Magnus Eriksson, Göteborg (SE); Erik Hjerpe, Göteborg (SE)

(73) Assignee: Autoliv Development AB, Vargarda (SE)

( * ) Notice: Subject to any disclaimer, the term of this patent is extended or adjusted under 35 U.S.C. 154(b) by 476 days.

(21) Appl. No.: 11/664,398

(22) PCT Filed: Sep. 21, 2005

(86) PCT No.: PCT/SE2005/001379

§ 371 (c)(1),
(2), (4) Date: Mar. 30, 2007

(87) PCT Pub. No.: WO2006/036106

PCT Pub. Date: Apr. 6, 2006

(65) Prior Publication Data

US 2008/0048423 A1   Feb. 28, 2008

(30) Foreign Application Priority Data

Sep. 30, 2004   (GB) ................. 0421768.3

(51) Int. Cl.
*B60K 28/10* (2006.01)

(52) U.S. Cl. ............... 180/274; 280/748; 280/750; 280/753

(58) Field of Classification Search ........... 280/748, 280/750, 753; 180/274
See application file for complete search history.

(56) References Cited

U.S. PATENT DOCUMENTS

| | | | | |
|---|---|---|---|---|
| 4,099,743 A | * | 7/1978 | Non | 280/753 |
| 4,365,825 A | * | 12/1982 | Merkle | 280/777 |
| 5,178,434 A | * | 1/1993 | Krebs | 296/37.3 |
| 6,158,766 A | * | 12/2000 | Kowalski | 280/730.1 |
| 6,213,505 B1 | * | 4/2001 | Van Wynsberghe et al. | 280/748 |
| 6,349,965 B1 | | 2/2002 | Heilig | |
| 2002/0132088 A1 | | 9/2002 | Birk et al. | |
| 2002/0185847 A1 | | 12/2002 | Khoudari et al. | |
| 2002/0190515 A1 | | 12/2002 | Birk et al. | |

FOREIGN PATENT DOCUMENTS

| | | | |
|---|---|---|---|
| DE | 195 41 607 A1 | 5/1997 |
| DE | 196 39 467 C1 | 1/1998 |
| DE | 202 15 571 U1 | 3/2003 |
| GB | 2 383 563 A | 7/2003 |
| JP | 10-316044 A | 12/1998 |
| JP | 11-11242 A | 1/1999 |

\* cited by examiner

*Primary Examiner*—Toan C To
(74) *Attorney, Agent, or Firm*—Harness, Dickey & Pierce, P.L.C.

(57) ABSTRACT

A safety arrangement is provided in a motor vehicle. The motor vehicle has a floor pan (1) terminating at its forward end with an inclined splash-wall (3, 4, 5). There is a moveable floor element (10) which has regions (12, 13, 14) which initially conform to and lie adjacent the splash-wall. There is a drive arrangement (15) associated with an accident sensor (16) to drive the moveable floor element rearwardly to a predetermined position. There is a fixed platform (17) located above a horizontal part of the floor pan to be located beneath the foot of a vehicle occupant and to provide a secure point for operation of a pedal. The movement of the moveable floor element (10) is restricted so that no part of the movable floor element impedes movement of a foot pedal (6) to the fully depressed condition.

19 Claims, 2 Drawing Sheets

Figure 1:
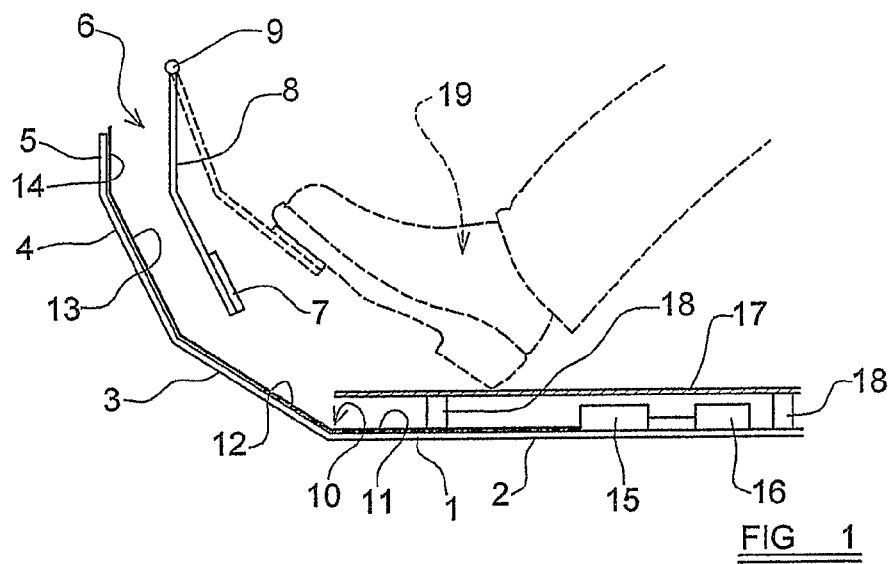

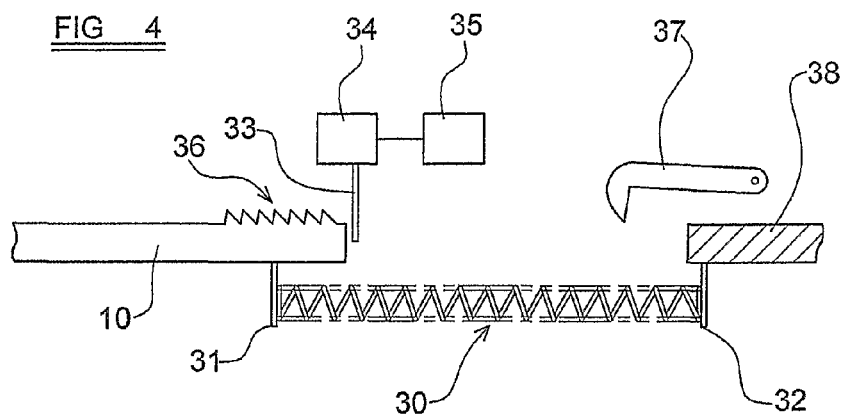
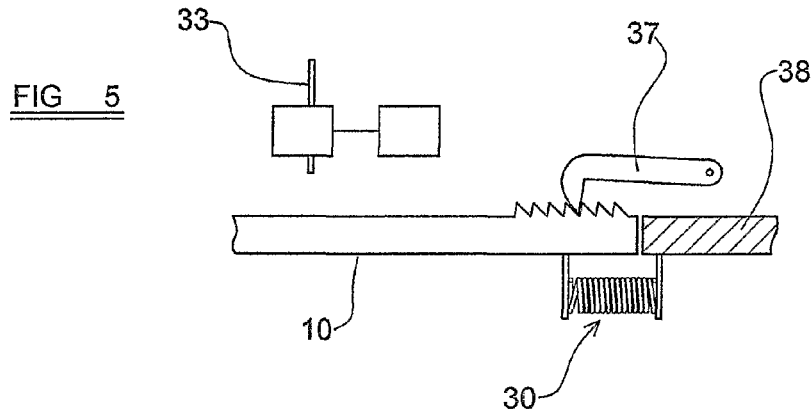
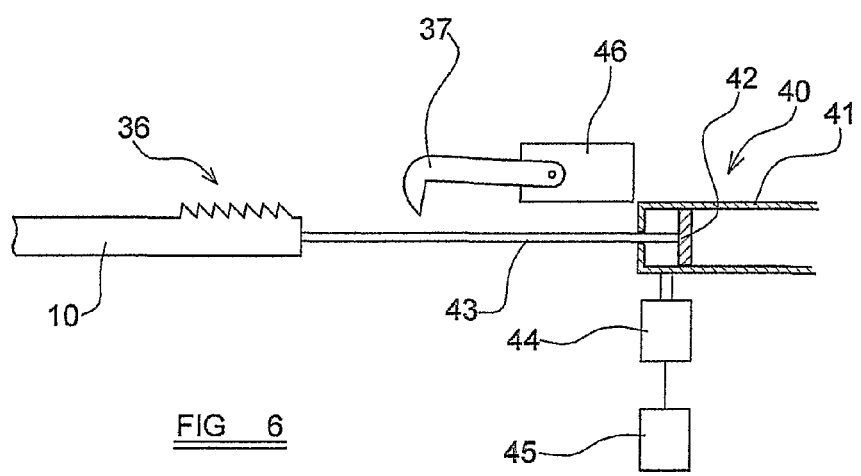

SAFETY ARRANGEMENT

CROSS-REFERENCE TO RELATED APPLICATIONS

This application is a U.S. National Stage of International Application No. PCT/SE2005/001379, filed Sep. 21, 2005 and published in English as WO 2006/036106 A1 on Apr. 6, 2006. This application claims the benefit of GB Application No. 0421766.3, filed Sep. 30, 2004. The disclosure(s) of the above applications are incorporated herein by reference.

FIELD

THE PRESENT INVENTION relates to a safety arrangement, and more particularly relates to a safety arrangement provided in a motor vehicle.

BACKGROUND

The safety arrangement of the present invention is intended to provide protection for the driver or front-seat passenger of a motor vehicle.

It has been found that in many accident situations, especially a frontal impact situation, the floor pan of a motor vehicle may be deformed, and if the deformed part of the floor pan is in the region of the foot of the driver or a vehicle occupant, then the foot, ankle or lower leg of the driver or occupant may be injured.

It has been proposed to provide a safety arrangement in a motor vehicle in which an air-bag is located on the floor of the vehicle in the foot-well at a position beneath the feet of the driver or front seat occupant of the vehicle. In the event that an accident is sensed, the air-bag may be inflated, thus effectively lifting the foot of the driver or vehicle occupant above the floor pan of the vehicle. Such an arrangement may prove to be satisfactory in many situations, but it is difficult to maintain the integrity of an air-bag located under the front carpet of a motor vehicle during the entire life of the motor vehicle. The air-bag may be punctured or may deteriorate to an unacceptable level due to the hostile environment experienced by the air-bag.

It has also been proposed to utilize a double-floor arrangement, with an upper floor element being moveably mounted on to a lower floor. However, all prior proposed arrangements suffer from one or more disadvantages.

SUMMARY

The present invention seeks to provide an improved safety arrangement.

According to one aspect of this invention there is provided a safety arrangement provided in a motor vehicle, the motor vehicle having a foot-well defined by a floor pan terminating, at its forward end, with an inclined splash-wall, the safety arrangement including a moveable floor element, the moveable floor element having regions which initially lie adjacent the splash-wall when the moveable floor element is in an initial position, the moveable element being associated with a drive arrangement which is associated with an accident sensor to be actuated in response to a signal from the accident sensor, the drive arrangement serving to drive the movable floor element from the initial position to a predetermined position, there being a substantially fixed platform located on or above part of the floor pan at a position which, in use of the safety device, will be immediately beneath a foot of a vehicle occupant, at least part of the moveable floor element being under the platform when the moveable element is in the predetermined position.

In this Specification the term "splash-wall" is used to mean an inclined or vertical wall provided at the forward or front part of a foot-well in a motor vehicle. The term is equivalent to splash-board or toepan.

In embodiments of the invention the accident sensor may be one of many different types of sensor—the sensor may sense an actual accident, such as an impact, or a potential accident situation, or may sense extreme braking, or skidding. Indeed the sensor may respond to any parameter that can be used to infer or confirm that an accident is happening or may be about to happen.

Preferably at least one pedal located in front of the splash-wall, the pedal being movable from an initial position to a fully depressed position, the movement of the moveable floor element being limited so that, when the moveable floor element has executed its movement to the predetermined position, the moveable floor element does not obstruct the pedal and does not obstruct access to the pedal thus permitting movement of the pedal to the fully depressed condition.

According to another aspect of this invention there is provided a safety arrangement provided in a motor vehicle, the motor vehicle having a foot-well defined by a floor pan terminating, at its forward end, with an inclined splash-wall, the safety arrangement including a moveable floor element, the moveable floor element having regions which initially lie adjacent the splash-wall when the moveable floor element is in an initial position, the moveable element being associated with a drive arrangement which is associated with an accident sensor to be actuated in response to a signal from the accident sensor, the drive arrangement serving to drive the movable floor element from the initial position to a predetermined position, there being at least one pedal located in front of the splash-wall, the pedal being movable from an initial position to a fully depressed position, the movement of the moveable floor element being limited so that, when the moveable floor element has executed its movement to the predetermined position, the moveable floor element does not obstruct the pedal, and does not obstruct access to the pedal thus permitting movement of the pedal to the fully depressed condition.

The pedal is preferably a brake pedal. Of course, two or three pedals may be provided, as is conventional, and the arrangement may be such that operation of both or all pedals is not obstructed.

Preferably a substantially fixed platform located above, on or part of the floor pan at a position which, in use of the safety device, will be immediately beneath a foot of a vehicle occupant.

Conveniently the platform is mounted to the floor pan of the vehicle by means of one or more shock-absorbing elements.

Preferably the or each shock-absorbing element is a block of resilient material.

Advantageously a mechanism is provided to lock the moveable floor element in the predetermined position.

Conveniently the drive mechanism is a reversible drive mechanism.

Preferably the sensor is adapted to sense the termination of an accident or the termination of a potential accident situation and to actuate the drive mechanism to return the moveable floor element to its initial position.

Advantageously the drive arrangement incorporates a rack-and-pinion drive.

In an alternative embodiment the drive arrangement includes a biasing spring, and a moveable retaining element which retains the moveable floor element in the initial position, the retaining element being moveable to a release position in response to said signal.

In a further alternative embodiment the drive arrangement includes a piston-and-cylinder unit and a gas generator to supply gas to the piston-and-cylinder unit in response to said signal.

According to a further aspect of this invention there is provided a safety arrangement provided in a motor vehicle, the motor vehicle having a foot-well defined by a floor pan terminating, at its forward end, with an inclined splash-wall, the safety arrangement including a moveable floor element, the moveable floor element having regions which initially lie adjacent the splash-wall when the moveable floor element is in an initial position, the moveable element being associated with a drive arrangement which is associated with an accident sensor to be actuated in response to a signal from the accident sensor, the drive arrangement serving to drive the movable floor element from the initial position to a predetermined position.

Preferably the arrangement incorporates a yieldable element to yield when a predetermined force is applied to the moveable floor element when it is in, or being driven to, the predetermined position, to permit the movable floor element to move to or remain at a position forward of the predetermined position.

In an embodiment of the invention of this type, should the feet of a seat occupant move forwardly with an excessive force, the yieldable element will yield permitting the movable floor element to move forwardly, or to remain at a position forward of the predetermined position, whilst absorbing energy. The presence of the yieldable element will prevent the moveable floor element from being forcibly moved rearwardly with the effect of imparting undesirable injury to the occupant.

Conveniently the drive arrangement is configured to execute a two-stage movement of the movable floor element, namely a first relatively short movement in response to a first signal from the sensor, and a full movement to the predetermined position in response to a second signal from the sensor.

It is envisaged that the two-stage movement may be effected in many different ways; For example, the first stage, of movement may be effected in response to a signal indicative that a crash or accident is about to occur, with the full movement to the predetermined position only being effected in response to a second signal which confirms that an accident has actually occurred. Alternatively the first stage of movement may be effected if a relatively minor accident is sensed, with the full movement being executed only in response to a signal indicating that a severe accident has been sensed. In such a situation the predetermined position may be a position in which the moveable floor element has moved to such an extent that the feet of the occupant have been totally separated or disengaged from any pedals that may be mounted in the vehicle.

Preferably the movement of the moveable floor element is a horizontal rearward movement.

DRAWINGS

Figure 2:
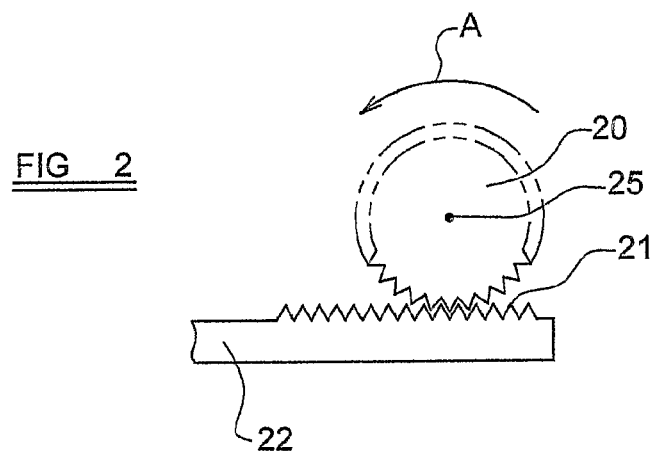
Figure 3:
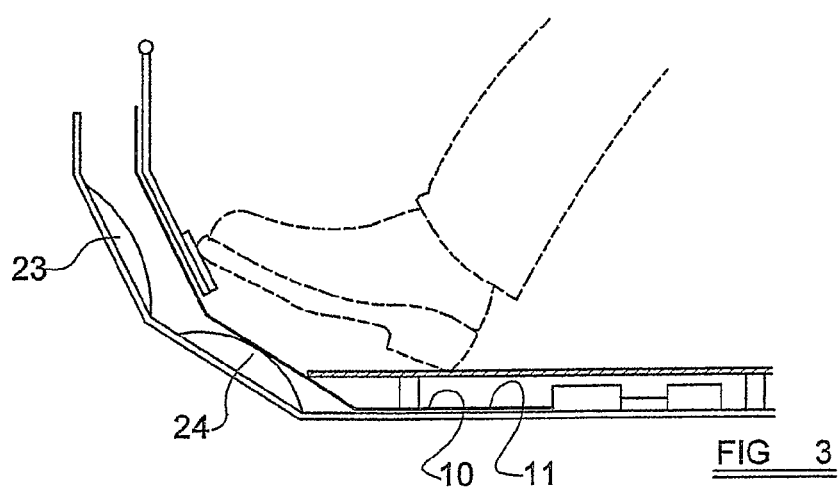

In order that the invention may be more readily understood, and so that further features thereof may be appreciated, the invention will now be described, by way of example, with reference to the accompanying drawings in which:

FIG. 1 is a diagrammatic cross-sectional view illustrating part of a motor vehicle, FIG. 2 is a diagrammatic view of part of a drive mechanism shown in FIG. 1, FIG. 3 is a view corresponding to FIG. 1 illustrating the situation that exists after an impact has occurred, FIG. 4 is a view of part of another embodiment with the moveable floor element in the initial position, FIG. 5 corresponds to FIG. 4 but shows the moveable floor element in its final position, and FIG. 6 is a view corresponding to FIG. 4 but showing another alternative embodiment of the invention.

DETAILED DESCRIPTION

Referring initially to FIG. 1 of the accompanying drawings, the floor pan 1 of a vehicle which defines a foot-well is shown. The floor pan 1 has a generally planar region 2, the forward-most edge of which merges into a first inclined region 3 which is inclined upwardly and forwardly at a predetermined angle to the horizontal, this portion in turn leading to a further region 4 which is extended upwardly and forwardly at a more severe angle, the region 4 itself terminating in a final region 5 which, in the illustrated embodiment, extends substantially vertically. The regions 3, 4 and 5 may together be termed the "splash-wall" or "firewall" of the vehicle floor. The inclined regions 3, 4, 5 are found, in a typical vehicle, at the forward-most part of the front foot-well of the vehicle, with the vertical part 5 extending upwardly towards the rear of the dashboard of the vehicle.

In FIG. 1 a pedal 6 to be actuated by the driver of the vehicle is illustrated. The illustrated pedal is the brake pedal. The brake pedal 6 includes a foot-pad 7, secured to the lower end of an elongate arm 8 which is mounted, at its upper end, to a pivot point 9. The brake pedal may move from a non-depressed position, shown in phantom in FIG. 1, to a fully depressed position as shown in FIG. 3.

Mounted adjacent the floor pan 1 of the motor vehicle is a moveable floor element 10. The moveable element 10 may be made of a rigid plastics material. The moveable floor element 10 has an initial planar region 11 which immediately overlies the planar region 2 of the floor pan 1. The forward-most edge of the planar region 11 is connected to a forwardly and upwardly inclined planar region 12 which corresponds closely with the planar region 3 of the splash-wall. The forward-most edge of the planar region 12 merges with a further planar region 13 which extends upwardly and forwardly at a more sharp angle, corresponding with the planar region 4 of the splash-wall. The movable floor element 10 also incorporates a substantially vertical region 14 extending upwardly from the forward-most edge of the inclined region 13, the vertical region 14 corresponding with the vertical region 5 of the splash-wall. Thus the moveable floor element has regions which, in an initial position of the moveable floor element 10, conform to and lie adjacent the splash-wall 3, 4, 5 of the fixed floor pan.

A drive arrangement 15 is provided to move the moveable floor element 10, the drive arrangement 15 being connected to receive a signal from an appropriate accident sensor 16. The sensor may sense a potential accident situation, or an actual accident or impact. Thus the sensor may be an optical or radar based pre-crash sensor, or a sensor responsive to deceleration or deformation of the vehicle. Alternatively the sensor may form part of an anti-skid braking system, or any other system that monitors the performance of the vehicle. The sensor may be a multi-functional sensor capable of sensing a number of different parameters.

The drive arrangement 15 and the sensor 16 may be positioned at any convenient point in the vehicle and thus the drive arrangement 15 may be beneath the seat, and the sensor may be on the front of the vehicle.

Mounted above the horizontal portion 2 of the vehicle floor 1 and the planar portion 11 of the movable floor element 10 is a raised fixed platform 17. The platform 17 may be mounted to the underlying vehicle floor 1, by means of shock-absorbers 18. Each shock absorber 18 may be a rod or block of rubber or similar resilient material.

The platform 17 forms a secure resting point for the heel of the foot 19 of a driver which may be positioned to depress the brake pedal 6. The platform 17 may have a carpeted upper surface.

The drive arrangement 15 is configured to move the moveable floor element 10 rearwardly from the initial position, in which the inclined regions 12, 13, 14 of the moveable floor element 10 lie immediately adjacent the splash-wall of the floor pan 1 of the vehicle, to a second predetermined position, thus creating a space between the inclined regions, 12, 13, 14 of the moveable floor element and the splash-wall.

In the illustrated embodiment the drive arrangement 15 incorporates a motor which drives a pinion wheel 20, as shown in FIG. 3, the periphery of the pinion wheel being provided with teeth which engage a toothed rack 21 formed on a drive member 22 which is connected to the rest of the moveable floor element 10. On rotation of the pinion 20 in one sense, as indicated by the arrow A shown in FIG. 2, the moveable floor element 10 will be moved horizontally rearwardly, relative to the vehicle to the second predetermined position, thus creating a space between the inclined planar regions 12, 13 and 14 of the movable floor element and the inclined regions 3, 4 and 5 of the splash-wall of the vehicle. The motor, when it is not operating, serves to lock the moveable floor element in position. In the illustrated embodiment the platform 17 is spaced above the horizontal section 2 of the floor pan, and a horizontal part 11 of the moveable floor element 10 is retracted into the space between the platform 10 and the floor pan 11 on movement of the moveable floor element.

When an accident or potential accident situation is sensed, the drive arrangement 15 is actuated, with the pinion 20 rotating to act on the rack 21, and consequently the movable floor element 10 moves horizontally rearwardly to the predetermined position shown in FIG. 3. It is to be noted that as the moveable floor element 10 is moved rearwardly, the movement is limited so that the inclined regions 12, 13 and 14 do not move to a position where they contact the pedal 6, even when it is in the fully depressed condition. Thus, the inclined regions 12, 13, 14 do not move to a position where they would be struck by the pedal as it is fully depressed. Also, if the inclined regions 12, 13, 14 are provided with a cut-out, so that they can move past the pedal without striking the pedal, the movement of the inclined regions 12, 13, 14 is restricted so that the regions 12, 13, 14 do not move past the exposed or operative face of the foot-pad 7 of the pedal 6 to ensure that the inclined regions do not obstruct a foot pressing the pedal to the fully depressed position. Thus access to the pedal is not obstructed.

Consequently even when the movable floor element has moved to its predetermined "retracted" position in which there is a clear space between the inclined regions 12, 13 and 14 of the movable floor element and the inclined regions 3, 4 and 5 of the fixed floor of the vehicle, movement of the foot pedal 6 to the fully depressed condition is not obstructed, and thus movement of the pedal is not impeded.

Thus in an accident situation, the driver of the vehicle may be able to depress the brake pedal to the fully depressed position. The driver will be able to achieve this relatively easily because the heel of the foot 19 of the driver is resting upon the platform 17. The platform 17, during the accident situation, will not move significantly because, even if the horizontal part 2 of the floor pan of the vehicle is deformed, the platform 17 is connected to the vehicle by means of shock-absorbers 18. Consequently, during the few moments of time that it takes for the impact to occur, the platform 17 will remain in a relatively stable position, enabling the driver of the vehicle to tilt his or her foot about the heel, which will be in contact with the platform 17, thus depressing the brake pedal to the fully depressed position as shown in FIG. 3.

Should the splash-wall of the vehicle be deformed, being driven inwardly, as shown by deformed regions 23, 24 in FIG. 3, the deformations will be accommodated in the space that has been created between the splash-wall and the inclined regions 12, 13, 14 of the moveable floor element.

It is thus envisaged that the risk of injury to the driver of the vehicle will be minimized.

In the described embodiment the platform is raised, and part of the moveable floor element 10 moves under the platform. However, the platform could be, or could be mounted directly on, the horizontal part 2 of the floor pan 1, and the moveable floor element 10 could consist simply of the inclined regions 12, 13 and 14, which might be connected to the drive arrangement 15 by Bowden cables or the like.

The pedals may be adjustably mounted, so that the pedals may be selectively positioned in accordance with the length of the legs of the driver, and the position of the seat. In such an arrangement a sensor senses the adjusted position of the pedals and controls the degree of movement of the moveable floor element 10, so that the predetermined retracted position of the moveable floor element 10 is appropriate, having regard to the adjusted position of the pedals.

It is to be appreciated that whilst the invention has been described with reference to a moveable floor element provided on the driver's side of the vehicle, a corresponding movable floor element may be provided in the front passenger well.

In slightly modified embodiments of the invention, either padding, or an inflatable air-bag, may be provided between the floor pan 1 of the vehicle and the moveable floor element 10.

In a preferred embodiment the sensor 16 may sense the termination of an accident, or the termination of a potential accident situation, and may then serve to actuate the drive arrangement 15 in the opposite sense, so that the pinion 20 turns in a direction which is counter to the direction shown by the arrow A in FIG. 2, thus returning the moveable floor element 10 to its initial position. Thus the arrangement will automatically "re-set".

It is envisaged that, in the embodiment of FIGS. 1 to 3, the drive arrangement 15 may be configured to execute a two-stage movement of the moveable floor element 10. Thus, in response to a first predetermined signal from the sensor, the drive arrangement 15 will cause the moveable floor element to move horizontally rearwardly by a short predetermined distance. In response to a second signal from the sensor, the moveable floor element would execute a full movement to a final position. The first signal from the sensor may be a sensor indicative that a potential accident has been sensed. The second signal may be a signal confirming that an accident is actually occurring. In an alternative arrangement the first signal may be a signal indicating that a relatively minor accident is occurring, whereas the second signal may be a signal confirming that a major accident is occurring. Of course, in embodiments of this type, the presence of the second signal would cause the full movement of the moveable floor element to be executed, regardless of whether the first signal has or has not been previously generated.

In embodiments of this type the final position of the moveable floor element may be such that the operation of the foot pedal is obstructed. Thus, in a major impact it may be appropriate to move the moveable floor element by such a distance that the feet of the driver are withdrawn from the pedals, with the inclined part of the moveable floor element moving past the pedals.

It is to be appreciated that in embodiments of the invention in which the moveable floor element executes a two-stage movement, the second stage of movement may only be executed in a severe accident situation. It may be preferable to provide an air-bag, to be located in the space between the moveable floor element and the splash-wall of the floor pan 1 of the vehicle to be inflated in such a situation.

As can be seen from FIG. 2, the pinion 20 is mounted on a shaft 25. The shaft 25 may be in the form of a torsion bar adapted to yield when subjected to a predetermined force. Thus, it is to be understood that the moveable floor element 10, after it has been moved to the retracted position, may be permitted to move forwardly, with the absorption of energy, under certain circumstances. For example, if the feet of a vehicle occupant are thrown forwardly during a frontal impact, the feet of the occupant may impact, with very substantial force, upon the inclined portions 12, 13, 14 of the moveable floor element 10, thus imparting injury to the feet if the floor element cannot move forwardly at all. Thus, whilst it is desirable to lock the floor element in position, to prevent free movement of the moveable floor element 10, it is also desirable to permit forward movement of the floor element 10 from the locked position under certain circumstances.

Consequently it is envisaged that if a predetermined force, such as a force of 2 kN is applied to the moveable floor element 10, for example due to impact of the feet of the occupant, the moveable floor element 10 should be permitted to move forwardly back towards its initial position, preferably by a distance of approximately half the distance between the predetermined retracted position and the initial position. This effect is achieved by the torsion bar 25 upon which the pinion wheel 20 is mounted. When the torsion bar is subjected to the force, the torsion bar will "twist", permitting the portion 22 of the moveable floor element 10 carrying the rack 21 to move forwardly by an appropriate distance.

Of course, other mechanisms may be provided to achieve this effect, for example by mounting the motor which drives the pinion 20 by means of a yieldable energy absorbing cylinder-and-piston arrangement, or by mounting the motor in position on some other yieldable deformable energy absorbing element.

In the embodiment described above with reference to FIGS. 1 to 3 the moveable floor element 10 is provided with a drive arrangement 15 which incorporates a pinion wheel 20 co-operating with a toothed rack 21. However, alternative forms of drive arrangement may be provided.

Referring to FIGS. 4 and 5, one alternative form of drive arrangement is illustrated for use with the moveable floor element 10. In the arrangement shown in FIGS. 4 and 5 the moveable floor element 10 is biased rearwardly by means of a resilient element or spring 30, the spring having one end 31 connected to the moveable floor element and the other end 32 secured to part of the vehicle. The spring serves to bias the moveable floor element 10 rearwardly. A retaining element 33 is provided which initially engages part of the moveable floor element 10 to maintain the moveable floor element 10 in its initial position. In this embodiment the moveable retaining element 33 is associated with an electromagnet 34 which forms a solenoid, the electromagnet 34 being connected to receive a signal from an accident sensor 35, to move the retaining element 33 to a release position.

Part of the moveable floor element 10 is provided with serrations forming a rack 36 and mounted adjacent the floor element is a pawl 37. A stop member 38 is also provided to limit movement of the moveable floor element.

When the accident sensor 35 senses an accident or a potential accident, the electromagnetic solenoid 34 serves to move the retaining element from the initial position illustrated in FIG. 4, in which the retaining element retains the moveable floor element 10 in its initial position, to a release position, as shown in FIG. 5. The retaining element 33 no longer retains the moveable floor element in the initial position and the moveable floor element can thus move rearwardly under the bias provided by the spring 30. Rearward movement of the moveable floor element is limited by the stop member 38, so that the floor element can only move to a predetermined second position. When the floor element is in the second position the pawl 37 engages the rack 36 provided on the moveable floor element, thus locking the moveable floor element in the retracted predetermined position. Thus, the moveable floor element will not just move forward freely should a force be applied to the moveable floor element, for example by the feet of an occupant of the vehicle.

It is to be appreciated that, in this embodiment, if the floor element has been moved rearwardly in an accident situation, the various components of the safety arrangement may readily be returned to their initial position. Thus the arrangement may be "re-set" relatively easily.

FIG. 6 illustrates a further alternative embodiment of the invention. In this embodiment of the invention the drive arrangement incorporates a piston-and-cylinder unit 40. The piston-and-cylinder unit 40 comprises a cylinder 41 which contains a piston 42. The piston 42 is connected, by means of a wire 43 to part of the moveable floor element 10. A gas generator 44 is provided to direct gas into the piston-and-cylinder unit in response to a signal from a sensor 45 which senses an accident or a potential accident situation. In this embodiment part of the moveable floor element 10 is serrated to provide a rack 36 which is to co-operate with a pawl 37 as described with reference to the embodiment illustrated in FIGS. 4 and 5. In this embodiment of the invention the front wall of the cylinder 41 serves the function of a stop element, limiting the rearward movement of the moveable floor element.

It is to be noted that, in this embodiment of the invention, the pawl is mounted in position by means of a yieldable energy absorbing element 46. The energy absorbing element 46 is a yieldable element which can yield when a predetermined force is applied to it.

In an accident situation the sensor 45 actuates the gas generator, and the gas generator supplies gas to the cylinder 41. The piston 42 thus moves towards the right as shown in FIG. 6, moving the movable floor element 10 towards the right. When the moveable floor element has moved to its predetermined retracted position, with part of the floor element in engagement with the front wall of the cylinder 41, the pawl 37 will engage the rack 36 to lock the moveable floor element in its predetermined retracted position.

It is to be appreciated that, whilst the pawl 37 engages the rack 36 to lock the moveable floor element 10 in its predetermined retracted position, should a very substantial force be applied to the retracted floor element 10 tending to move the retracted floor element 10 forwardly towards its initial position, the energy absorbing yieldable element 46 will yield, permitting the pawl, and consequently also the moveable floor element 10 to move forwardly. As the floor element 10 moves forwardly so energy is absorbed by the yieldable element 46 and also as a consequence of re-compression of the gas within the cylinder 41, if, indeed, any gas remains within the cylinder 41. Here it is to be understood that the cylinder 41 may be vented to prevent excess pressure being generated within the cylinder 41.

Consequently it is to be understood that this embodiment will again operate to permit the moveable floor element to move forwardly if a very high force, such as a force in excess of 2 kN is applied to it.

In all of the described embodiments of the invention the moveable floor element may be made of plastic or of metal. The moveable floor element may simply slide on the floor pan of the vehicle, or may be provided with rollers or the like. In preferred embodiments the inclined regions 12, 13, 14 of the moveable floor element are deformable, either plastically, or elastically, so that in an accident situation, if the feet of the occupant are thrown forwardly the angle between the foot and the leg will not alter substantially, as the inclined regions 12, 13, 14 will yield when subjected to a force in excess of a predetermined force. Thus the risk of the occupant being injured in the ankle region due to "bending back" of the foot is minimized.

It is to be understood that in preferred embodiments of the invention the moveable element executes a horizontal rearward movement. This is in contrast to the generally upward and rearward movement executed by prior proposed arrangements, particularly prior proposed arrangements in which an air-bag is mounted on the floor of the foot-well of the vehicle. It is believed that the horizontal and rearward movement will minimize the risk of injuries occurring in the ankle region which might otherwise occur if the part of the floor initially engaged by the foot is moved upwardly and rearwardly.

It is to be appreciated that preferred embodiments of the invention may have various advantages as compared with prior proposed arrangements.

As will be understood, in most embodiments of the invention there is no air-bag. An air-bag is provided in one embodiment, but only to be deployed in a very severe accident situation.

It is believed that this will provide an advantage since in many cases an air-bag inflates extremely rapidly, and if an air-bag is utilized, on all occasions, to effect movement of the feet of an occupant, then there may be a substantial risk that the feet of the occupant will, in any event, be injured or damaged in some way.

Some embodiments of the invention are easily "re-set" following a potential accident situation. This is, of course, advantageous, since it is much easier to "re-set" a safety arrangement than to insert a new pyrotechnic charge or a new air-bag into a safety arrangement.

Many embodiments of the invention enable a very precisely predetermined level of force to be applied to the moveable floor element. The amount of force may be adjusted in dependence upon the severity of the accident. The force applied to move the moveable floor element is, of course, closely related to the force actually applied to the foot or feet of the occupant as a consequence of movement of the floor pan. Consequently the ability to adjust or control the level of force can, in many cases, be advantageous.

When used in this Specification and Claims, the terms "comprises" and "comprising" and variations thereof mean that the specified features, steps or integers are included. The terms are not to be interpreted to exclude the presence of other features, steps or components.

The invention claimed is:

1. A safety arrangement in a motor vehicle having a foot-well defined by a floor pan terminating, at its forward end, with an inclined splash-wall, the safety arrangement comprising:
    a moveable floor element, the moveable floor element having regions initially positioned proximate the splash-wall when the moveable floor element is in an initial position;
    a drive arrangement associated with the moveable element, the drive arrangement further associated with an accident sensor to be actuated in response to a signal from the accident sensor, the drive arrangement serving to drive the moveable floor element from the initial position to a predetermined position; and
    a substantially fixed platform for location on or above part of the floor pan at a position which, in use of the safety device, will be immediately beneath a foot of a vehicle occupant;
    wherein at least part of the moveable floor element is under the platform when the moveable element is in the predetermined position.

2. The safety arrangement of claim 1, wherein at least one pedal is located in front of the splash-wall, the at least one pedal being moveable from an initial position to a fully depressed position, the movement of the moveable floor element being limited so that, when the moveable floor element has executed its movement to the predetermined position, the moveable floor element does not obstruct the pedal and does not obstruct access to the pedal thus permitting movement of the pedal to the fully depressed condition.

3. The safety arrangement of claim 2, wherein the pedal is a brake pedal.

4. The safety arrangement of claim 1, wherein the platform is mounted to the floor pan of the vehicle by one or more shock-absorbing elements.

5. The safety arrangement of claim 4, wherein the shock-absorbing element is a block of resilient material.

6. The safety arrangement of claim 1, wherein a mechanism is provided to lock the moveable floor element in the predetermined position.

7. The safety arrangement of claim 1, wherein the drive mechanism is a reversible drive mechanism.

8. The safety arrangement of claim 7, wherein the sensor is adapted to sense the termination of an accident or the termination of a potential accident situation and to actuate the drive mechanism to return the moveable floor element to its initial position.

9. The safety arrangement of claim 1, wherein the drive arrangement incorporates a rack-and-pinion drive.

10. The safety arrangement of claim 1, wherein the drive arrangement includes a biasing spring, and a moveable retaining element which retains the moveable floor element in the initial position, the retaining element being moveable to a release position in response to the signal.

11. The safety arrangement of claim 1, wherein the drive arrangement includes a piston-and-cylinder unit and a gas generator to supply gas to the piston-and-cylinder unit in response to the signal.

12. The safety arrangement of claim 1, wherein the arrangement incorporates a yieldable element to yield when a predetermined force is applied to the moveable floor element when it is in, or being driven to, the predetermined position, to permit the moveable floor element to move or remain at a position forward of the predetermined position.

13. The safety arrangement of claim 1, wherein the drive arrangement is configured to execute a two-stage movement of the moveable floor element, namely a first relatively short movement in response to a first signal form the sensor, and a full movement to the predetermined position in response to a second signal from the sensor.

14. The safety arrangement of claim 1, wherein the movement of the moveable floor element is a horizontal rearward movement.

15. A safety arrangement in a motor vehicle, the motor vehicle having a foot-well defined by a floor pan terminating, at its forward end, with an inclined splash-wall the safety arrangement comprising:
  a moveable floor element, the moveable floor element having regions which initially lie adjacent the splash-wall when the moveable floor element is in an initial position, the moveable element being associated with a drive arrangement which is associated with an accident sensor to be actuated in response to a signal from the accident sensor, the drive arrangement serving to drive the moveable floor element from the initial position to a predetermined position, there being at least one pedal located in front of the splash-wall, the pedal being moveable from an initial position to a fully depressed position, the movement of the moveable floor element being limited so that, when the moveable floor element has executed its movement to the predetermined position, the moveable floor element does not obstruct the pedal and does not obstruct access to the pedal, thus permitting movement of the pedal to the fully depressed condition.

16. The safety arrangement of claim 15, wherein a substantially fixed platform is located on or above part of the floor pan at a position which, in use of the safety device, will be immediately beneath a foot of a vehicle occupant.

17. A safety arrangement provided in a motor vehicle, the motor vehicle having a foot-well defined by a floor pan having a generally planar region terminating, at its forward end, with an inclined splash-wall wherein the safety arrangement includes a moveable floor element, the moveable floor element having a planar region overlying the planar region of the floor pan, and having, at its forward end, a region which initially lies adjacent the splash-wall when the moveable floor element is in an initial position, the moveable element being associated with the drive arrangement which is associated with an accident sensor to be actuated in response to a signal from the accident sensor, the drive arrangement serving to drive the moveable floor element from the initial position to a predetermined position, there being raised fixed platform located above the planar region of the floor pan at a position which, in use of the safety device, will be immediately beneath a foot of a vehicle occupant, at least part of the moveable floor element being under the platform when the moveable element is in the predetermined position, there being at least one foot pedal located in front of the splash-wall, the pedal being moveable from an initial position to a fully depressed position, the movement of the moveable floor element being limited so that, when the moveable floor element has executed its movement to the predetermined position, the moveable floor element does not obstruct the pedal and does not obstruct access to the pedal, thus permitting movement of the pedal to the fully depressed position, the arrangement incorporating a yieldable element to yield when a predetermined force is applied to the moveable floor element as it is being driven to the predetermined position to permit the moveable floor element to remain at a position forward of the predetermined position.

18. A safety arrangement in a motor vehicle having a foot-well defined by a floor pan terminating at a forward end with an inclined splash-wall, the safety arrangement comprising:
  a moveable floor element having regions positioned proximate the splash-wall when the moveable floor element is in a first position;
  a drive arrangement associated with a sensor and operable to drive the moveable floor element from the first position to a second position in response to a signal from the sensor; and
  a platform located on or above a part of the floor;
  wherein at least part of the moveable floor element is under the platform when the moveable floor element is in the first position.

19. The safety arrangement in a motor vehicle of claim 18, in combination with a motor vehicle.

* * * * *